United States Patent [19]

Eckstein et al.

[11] 3,846,402

[45] Nov. 5, 1974

[54] THIOPHOSPHATE ANALOGUES OF THE NUCLEOSIDE DIPHOSPHATES AND TRIPHOSPHATES AND A METHOD FOR THE PREPARATION THEREOF

[75] Inventors: Fritz Eckstein; Roger Sydney Goody, both of Gottingen, Germany

[73] Assignee: Max-Planch-Gesellschaft zur Forderung der Wissenschaften e.V., Gottingen, Germany

[22] Filed: May 2, 1972

[21] Appl. No.: 249,579

[30] Foreign Application Priority Data

May 6, 1971 Germany............................ 2122529

[52] U.S. Cl. ........................... 260/211.5 R, 424/180
[51] Int. Cl. ...................... C07d 51/52, C07d 51/54
[58] Field of Search ............................ 260/211.5 R

[56] References Cited
UNITED STATES PATENTS 3,687,808  8/1972  Merigan, Jr. et al......... 260/211.5 R
3,709,873  1/1973  Fujimoto.................... 260/211.5 R

*Primary Examiner*—Johnnie R. Brown
*Attorney, Agent, or Firm*—Burgess, Dinklage & Sprung

[57] ABSTRACT

Novel thiophosphate compound of the formula

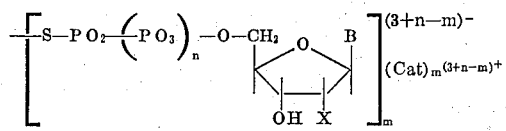

in which B represents a natural or modified nucleine base, X is hydroxyl or hydrogen, $m$ and $n$, independently of one another, are the integer 1 or 2; and Cat is a cation or hydrogen; and the salts thereof, are prepared by reacting a nucleoside-5'-mono- or diphosphate with diphenylphosphoric acid chloride and a compound of the General Formula II

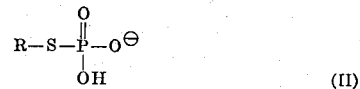

in which R represents the group

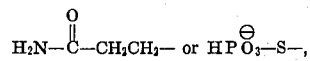

cleaving the group R from the reaction product, and, in some cases, oxidizing the nucleoside-5'-0-thiodi- or triphosphate thus obtained to the disulfide. Such compounds are useful, e.g., in affinity chromotography of enzymes and the labeling of proteins.

10 Claims, No Drawings

THIOPHOSPHATE ANALOGUES OF THE NUCLEOSIDE DIPHOSPHATES AND TRIPHOSPHATES AND A METHOD FOR THE PREPARATION THEREOF

The invention relates to new thiophosphate compounds, which are analogs of the nucleoside diphosphates and triphosphates, in which an oxygen atom on the terminal phosphorus atom of the phosphoric acid anhydride chain is replaced by a sulfur atom, and to a method of preparing these compounds.

Nucleotide analogs which were modified by the replacement of an oxygen on the phosphate group by sulfur have been described heretofore. Nucleotide anhydrides which have a sulfur atom on the α phosphorus atom are also known in the art. The prior art compounds have interesting properties when they are used in enzymatic reactions in competition with the corresponding natural nucleotides. One important disadvantage of these compounds, however, lies in the fact that, owing to the asymmetry of the α phosphorus atom, they are present in the nucleotide in diastereoisomeric forms which are extremely difficult to separate and which may have an entirely different action special enzymes. These difficulties do not occur in the diphosphates and triphosphates which contain sulfur on the terminal phosphorus atom, because these compounds have no asymmetry at this point. However, such compounds have been difficult to prepare.

The instant invention provides new compounds of the formula

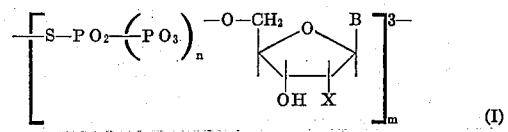

(I)

in which B represents a natural or modified nucleine base,

X represents a hydrogen atom or a hydroxyl group, and $m$ and $n$ are integers from 1 to 2, and the salts of these compounds.

In the above general formula, if B is a natural nucleine base, it may be adenine, guanine, hypoxanthine, cytosine, uracil, thymine, 5-methylcytosine or 5-hydroxymethylcytosine. If X represents a hydroxyl group, the compound will be the derivatives of the normal nucleotides, and, if X represents a hydrogen atom, the compound will be the corresponding deoxyribonucleotides.

Examples of the compounds of the invention are adenosine-5'-0-(2-thiodiphosphate), guanosine-5'-0-(2-thiodiphosphate), inosine-5'-0-(-thiodiphosphate), cytidine-5'-0-(2-thiodiphosphate), uridine-5'-0-(2-thiodiphosphate), thymidine-5'-0-(2-thiodiphosphate), 5-methylcytidine-5'-0-(2-thiodiphosphate), 5-hydroxymethylcytidine-5'-0-(2-thiodiphosphate), adenosine-5'-0-(2-thiodiphosphate)-disulfide, guanosine-5'-0-(2-thiodiphosphate)-disulfide, inosine-5'-0-(2-thiodiphosphate)-disulfide, cytidine-5'-0-(2-thiodiphosphate)-disulfide, uridine-5'-0-(2-thiodiphosphate)-disulfide, thymidine-5'-0-(2-thiodiphosphate)-disulfide, adenine-5'-0-(3-thiotriphosphate), guanosine-5'-0-(3-thiotriphosphate), inosine-5'-0-(3-thiotriphosphate), cytidine-5'-0-(3-thiotriphosphate), uridine-5'-0-(3-thiotriphosphate), thymidine-5'-0-(3-thiotriphosphate), adenine-5'-0-(3-thiotriphosphate)-disulfide, guanosine-5'-0-(3-thiotriphosphate)-disulfide, inosine-5'-0-(3-thiotriphosphate)-disulfide, cytidine-5'-0 -(3-thiotriphosphate)-disulfide, uridine-5'-0-(3-thiotriphosphate)-disulfide and thymidine-5'-0-(3-thiotriphosphate)-disulfide.

It will thus be understood that the formula (I), above, covers several subgenera, viz. (a) when $m = 1$, compounds in which the free sulfur valence is occupied by hydrogen (to yield a mono-thio compound) and the total minus charge on the bracketed portion of the formula (I) is $(n+1)$, because each of the phosphate moieties requires a hydrogen atom or cation to satisfy valence requirements; thus, when, e.g., $n = 1$ and the negative charges are satisfied by hydrogen, the phosphate moieties are as follows:

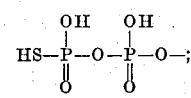

when, e.g., $n = 2$ and the negative charges are satisfied by a cation ("Cat"), the phosphate moieties are as follows:

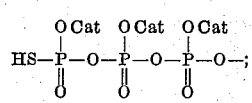

(b) when $m = 2$, compounds in which two of the moieties shown in the formula (I) are linked through the sulfur atoms, to form a symmetrical disulfide compound (wherein the negative phosphate valences are also satisfied as described above).

Thus it will be seen that there are encompassed in this invention disulfide compounds in which the phosphate moieties negative valences are satisfied by hydrogen or a cation, and monothiol compounds in which the phosphate moieties are similarly completed.

If in the above general formula B is a modified nucleine base, it is derived from the natural nucleine bases by the replacement of one or more substituents on the nucleus. Thus, halogen atoms, alkyl groups, substituted amino groups and sulfhydryl groups may be bound to the purine or pyrimidine nucleus in the various positions. Examples of such compounds are 1-methyl-, 2-methyl- or 7-methyladenine, -guanine, -hypoxanthine, -xanthine, 3-methylcytosine, $N^4$-methylcytosine, 5-bromouracil, 5-iodouracil, 5-chlorouracil, 8-bromoguanine, 8-iodoguanine, 8-fluoroguanine, $N^6$-dimethyladenine, 1-dimethylallyladenine, 2-aminopurine, 2-ketopurine, 2-thiouracil or 4-thiouracil, orotic acid, 1-methyluracil, 3-methyluracil, 5-hydroxyuracil, 5-hydromethyluracil, monoalkylamino and dialkylamino purines, and the like.

The new compounds of General Formula I are prepared in accordance with the invention by reacting a nucleoside-5'-mono- or diphosphate with diphenylphosphoric acid chloride and a compound of the General Formula II

in which R represents the group

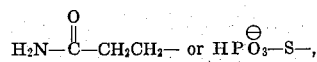

cleaving the group R from the reaction product, and, in some cases, oxidizing the nucleoside-5'-0-thiodi- or triphosphate thus obtained to the disulfide.

The reaction takes place preferably in a polar organic solvent. The sequence in which the three reaction components are made to react with one another is not critical, and simple preliminary experiments will make it possible to determine which reaction sequence is most advantageous for the preparation of a particular product. Thus, according to one embodiment of the process of the invention, first the $P^1$-diphenyl-$P^2$-nucleoside-5'-pyrophosphate is prepared and then it is reacted in the polar organic solvent with S-2-carbamoylethylthiophosphate and the reaction product is alkalinely saponified and oxidized, if desired, to the disulfide.

According to another embodiment of the process of the invention, the $P^1$-diphenyl-$P^2$-nucleoside-5'-pyrophosphate obtained as described above is reacted with a dithiophosphoric acid salt in the polar solvent and the reaction product is reduced with a mercapto compound and oxidized, if desired, to the disulfide.

According to still another embodiment of the process of the invention, S-2-carbamoylthiophosphate is reacted with diphenylphosphoric acid chloride and the reaction product is reacted with the nucleoside-5'-diphosphate; the product obtained is alkalinely saponified and oxidized, if desired, to the disulfide.

Pyridine is especially desirable as a polar organic solvent, although other polar organic solvents are suitable.

The reactions can be performed at temperatures between about 0° and 100°C; they are performed preferably at room temperature.

The cleaving of the group R from the reaction product is performed, in the case of the carbamoylethyl group, preferably by heating with dilute alkali, and in the case of the thiophosphoric acid group preferably by reduction with a mercapto compound. β-Mercaptoethanol has proven especially suitable as the mercapto compound.

The starting compounds containing phosphoric acid groups used in the process of the invention may be in their free form, in which case a polar organic solvent that is suitable for the formation of salts is preferred, or they may be in the form of salts which are soluble in organic solvents, especially salts formed with tertiary amines.

The oxidation of the nucleoside-thiodi- or -triphosphates obtained to the corresponding disulfide can be performed by conventional methods for the transformation of sulfhydryl groups to disulfides. Oxidation with potassium ferricyanide or dilute hydrogen peroxide is preferred.

The new compounds of the invention are of great scientific and therapeutic interest because their structure is closely related to the nucleotides. They can be used for the affinity labeling of proteins having SH or SS groups in their active center, and for the affinity chromatography of enzymes dependent upon nucleotides. In the field of pharmacology they are distinguished by their resistance to phosphatases and hence their greater stability. They can therefore compete with the natural nucleotides in metabolism and cam be used wherever nucleotides and polynucleotides participate in the metabolism.

The following examples will further explain the invention.

EXAMPLE 1

347 mg of adenosine-5'-phosphate (1 millimole) in the form of the free acid was added to 5 ml of dry methanol and 0.43 ml of tri-n-octylamine (1 millimole) and the mixture was slightly heated until complete dissolution had occurred. Then the solvent was drawn off at reduced pressure and the residue was dried by repeated concentration by evaporation with ml aliquots of dry dimethylformamide. Then 7 ml of dry dioxane was added, followed by 1 ml of dry dimethylformamide if immediate dissolution did not occur. Then 0.3 ml of diphenyl phosphoric acid chloride was added, followed by 0.3 ml of tri-n-butylamine. A white precipitate formed, which re-dissolved upon stirring. After 3 hours of standing, the solvent was removed by evaporation and 50 ml of dry ether was added. The mixture was let stand at 4°C for one-half hour and then the ether was decanted. 5 ml of dry dioxane was added to the residue and the suspension thus obtained was evaporated to the dry state. Then a solution of 2 millimoles of S-2-carbamoylethylthiophosphate was added in the form of the tri-n-butylammonium salt in 6 ml of dry pyridine. The mixture was let stand at room temperature for 3 hours while a precipitate formed. The pyridine was removed under reduced pressure, 80 ml of 0.2N NaOH was added, and the turbid solution obtained was heated for 10 minutes at 100°. After cooling, the mixture was neutralized with Merck ion exchanger I in the pyridinium form, treated with 0.5 ml of β-mercaptoethanol, filtered, and chromatographed through DEAE cellulose using a linear gradient of triethyl ammonium bicarbonate buffer pH 7.5 between 0.05 and 0.3 M. The product was eluted at about 0.22 M. The yield amounted to 35 percent with reference to adenosine-5'-phosphate. The compound has the adenosine spectrum:

$\lambda_{max}^{H_2O}$ 259 m$\mu$ ($\Sigma$ 15,000) Adenosine /P = / : 2.07

EXAMPLE 2

302 mg (1 millimole) of dipotassium dihydrogen dithiophosphate was transformed to the pyridinium salt by passing through Merck I Ion Exchanger in pyridine form. 2 millimoles of tri-n-butylamine was added to the pyridinium salt and the mixture was vacuum-dried. The product was dissolved in 4 ml of dry pyridine and then was used in the process described in Example 1 in place of the S-2-carbamoylethylthiophosphate, 0.5 millimoles of adenosine-5'-phosphate having been the starting produce in the preparation of the $P^1$-diphenyl-$P^2$-nucleoside. After 16 hours of standing at room temperature the solvent was removed by vacuum distillation, the residue was dissolved in 20 ml of water and was treated with 2 ml of β-mercaptoethanol and purified on DEAE cellulose as described in Example 1. The yield was 26 percent of the amount of adenosine-5'-phosphate that was put in. The product was identical with that of Example 1.

EXAMPLE 3

0.5 millimole of S-2-carbamoylethylthiophosphate lithium salt was transformed with the ion exchanger, as described in Example 2, to the pyridinium salt, and then was transformed to the mono-(tri-n-octylammonium) salt with 0.22 ml (0.5 millimoles) of tri-n-octylamine. The product was dissolved in 3.5 ml of dry dioxane and 0.15 ml of diphenylphosphoric acid chloride was added, followed by 0.23 ml of tri-n-butylamine. The solution was let stand for 2 hours at room temperature and then concentrated by evaporation under reduced pressure. 10 ml of ether was added, and after shaking briefly, 20 ml of petroleum ether was added (40° to 60°) and the mixture was let stand at 4°C for one-half hour. The supernatant liquid was decanted, the residue dissolved in 3 ml of dry dioxane, and the solution was concentrated in vacuo. To the syrup thus obtained, 0.25 millimole of adenosine-5'-diphosphate-[mono-(tri-n-octylammonium)-mono-(tri-n-butylammonium)] salt in 3 ml of dry pyridine was added, and the solution was let stand for 2 hours at room temperature. The solvent was removed under reduced pressure, then 20 ml of 2N NaOH was added and the mixture was heated for 10 minutes at 100°C. After cooling, the solution was neutralized with the use of an ion exchange resin, 0.5 ml of β-mercaptoethanol was added, and the product was purified by chromatography on DEAE cellulose using a linear triethylammonium bicarbonate buffer pH 7.5, 0.15 to 0.4 M. The desired adenosine-5'-0-(3-thiotriphosphate) was eluted at about 0.28 M. By repeating the chromatography on DEAE Sephadex at buffer concentrations between 0.35 and 0.6 M, the product was purified, coming from the column at about 0.5 M. The compound has the adenosine spectrum $\lambda_{max}^{H_2O}$ 259 m$\mu$ ($\Sigma$15,000), adenosine /P = / : 2.94.

EXAMPLE 4

1 millimole of the adenosine-5'-0-(2-thiodiphosphate) obtained according to Example 1, dissolved in water, was combined with an aqueous potassium ferricyanide solution and let stand for 5 minutes at room temperature. The solution obtained was transferred to chromatography paper and separated electrophoretically at pH 7.5 and 2200 V. The adenosine-5'-0-(2-thiodiphosphate)-disulfate was eluted with a solution of equal parts of methanol and water. Yield: 60 percent. The compound has the adenosine spectrum $\lambda_{max}^{H_2O}$ 259 m$\mu$ ($\Sigma$30,000).

EXAMPLE 5

6 micromoles of adenosine-5'-0-(2-thiodiphosphate) in 0.8 ml of water was treated with 0.1 ml of 3 percent hydrogen peroxide solution and then immediately dried by evaporation. One milliliter of water was added to the residue and then removed by evaporation. This was repeated three times in order to remove the residual hydrogen peroxide. A quantitative transformation to the disulfide took place.

EXAMPLE 6

Adenosine-5'-0-(3-thiotriphosphate) was oxidized as described in Example 4 to adenosine-5'-0-(3-thiotriphosphate)-disulfite. The yield was 50 percent.
The substance has the adenosine spectrum $\lambda_{H_2O}^{max}$ 259 m$\mu$ ($\Sigma$30,000).

EXAMPLE 7

Adenosine-5'-0-(3-thiotriphosphate) was oxidized as described in Example 5 to adenosine-5'-0-(3-thiotriphosphate)-disulfide. The yield amounted to 90 percent.

The procedure of Examples 1 to 7 were repeated, but instead of the adenosine compound, the corresponding guanosine, inosine, cytidine, uridine, thymidine, 5-methylcytosine or 5-hydroxymethylcytosine compound was used in each case. In like manner, corresponding deoxy compounds were used. In all cases the reactions took place in the same manner with comparable yields.

It will be understood that the specification and examples are illustrative but not limitative of the present invention and that other embodiments within the spirit and scope of the invention will suggest themselves to those skilled in the art.

What is claimed is:

1. Thiophosphate compound selected from the group consisting of adenosine-5'-0-(2-thiodiphosphate), guanosine-5'-0-(2-thiodiphosphate), inosine-5'-0-(thiodiphosphate), cytidine-5'-(thiodiphosphate), cytidine-5'-0-(2-thiodiphosphate), uridine-5'-0-(2-thiodiphosphate), thymidine-5'-0-(2-thiodiphosphate), 5-methylcytidine-5'-0-(2-thiodiphosphate), 5-hydroxymethylcytidine-5'-0-(2-thiodiphosphate), 5-hydroxymethylcytidine-5'-0-(2-thiodiphosphate), adenosine-5'-0-(2-thiodiphosphate)-disulfide, guanosine-5'-0-(2-thiodiphosphate)-disulfide, inosine-5'-0-(2-thiodiphosphate)-disulfide, cytidine-5'-0-(2-thiodiphosphate)-disulfide, uridine-5'-0-(2-thiodiphosphate)-disulfide, thymidine-5'-0-(2-thiodiphosphate)-disulfide, adenosine-5'-0-(3-thiotriphosphate), guanosine-5'-0-(3-thiotriphosphate), inosine-5'-0-(3-thiotriphosphate), cytidine-5'-0-(3-thiotriphosphate), uridine-5'-0-(3-thiotriphosphate), thymidine-5'-0-(3-thiotriphosphate), adenine-5'-0-(3-thiotriphosphate)-disulfide, guanosine-5'-0-(3-thiotriphosphate)-disulfide, inosine-5'-0-(3-thiotriphosphate)-disulfide, cytidine-5'-0-(3-thiotriphosphate)-disulfide, uridine-5'-0-(3-thiotriphosphate)-disulfide and thymidine-5'-0-(3-thiotriphosphate)-disulfide; and the corresponding desoxy compounds.

2. Thiophosphate compound as claimed in claim 1 wherein said compound is adenosine-5'-0-(2-thiodiphosphate).

3. Thiophosphate compound as claimed in claim 1 wherein said compound is guanosine-5'-0-(2-thiodiphosphate).

4. Thiophosphate compound as claimed in claim 1 wherein said compound is inosine-5'-0-(thiodiphosphate).

5. Thiophosphate compound as claimed in claim 1 wherein said compound is cytidine-5'-(thiodiphosphate).

6. Thiophosphate compound as claimed in claim 1 wherein said compound is cytidine-5'-0-(2-thiodiphosphate).

7. Thiophosphate compound as claimed in claim 1 wherein said compound is uridine-5'-0-(2-thiodiphosphate).

8. Thiophosphate compound as claimed in claim 1 wherein said compound is thymidine-5'-0-(2-thiodiphosphate).

9. Thiophosphate compound as claimed in claim 1 wherein said compound is 5-methylcytidine-5'-0-(2-thiodiphosphate).

10. Thiophosphate compound as claimed in claim 1 wherein said compound is 5-hydroxymethylcytidine-5'-0-(2-thiodiphosphate).

* * * * *